United States Patent [19]

Stolfo

[11] Patent Number: 4,843,540
[45] Date of Patent: Jun. 27, 1989

[54] PARALLEL PROCESSING METHOD

[75] Inventor: Salvatore J. Stolfo, Ridgewood, N.J.

[73] Assignee: The Trustees of Columbia University in the City of New York, New York, N.Y.

[21] Appl. No.: 903,031

[22] Filed: Sep. 2, 1986

[51] Int. Cl.$^4$ .......................... G06F 3/00; G06F 7/38; G06F 9/00

[52] U.S. Cl. .................................................. 364/200

[58] Field of Search ....................... 364/200 MS File, 300 MS File, 900 MS File

[56] References Cited

U.S. PATENT DOCUMENTS

| 4,101,960 | 7/1978 | Stokes et al. | 364/200 |
|---|---|---|---|
| 4,251,861 | 2/1981 | Mago | 364/200 |
| 4,344,134 | 8/1982 | Barnes | 364/200 |
| 4,435,758 | 3/1984 | Lorie et al. | 364/200 |
| 4,543,630 | 9/1985 | Neches | 364/200 |
| 4,583,164 | 4/1986 | Tolle | 364/200 |
| 4,622,632 | 11/1986 | Tanimoto et al. | 364/200 |

OTHER PUBLICATIONS

D. P. Miranker, 11/15/83, "Performance Analysis of Two Competing DADO PE Designs".
S. Taylor, 7/29/83, "Prolog on the DADO Machine: A Parallel System for High-Speed Logic Programming".
S. J. Stolfo, Mar. 1982, "A Tree-Structured Machine Architecture for Production Systems".
S. J. Stolfo, Aug. 15, 1983, "The DADO Parallel Computer".
S. J. Stolfo, 9/15/80, "Learning Control of Production Systems".
M. van Biema, 2/6/84, "PSL: A Parallel Lisp for the DADO Machine".
M. D. Lerner, 2/4/85, "A LISP Compiler for the DADO Parallel Computer".
S. J. Stolfo, 2/29/84, "PPL/M: The System Level Language for Programming the DADO Machine".
S. Alterman, 4/15/85, "The Application of the AI and DADO Parallel Processor Technology to Future Unmanned Vehicle Systems".
P. Waldes, 4/16/85, "Are Maintenance Expert Systems Practical Now?".
S. J. Stolfo, 5/5/84, "Is CAD/CAM Ready for AI?".
S. J. Stolfo, 5/5/83, "Knowledge Engineering: Theory and Practice".
S. J. Stolfo, 10/15/83, "ACE: An Expert System Supporting Analysis and Management Decision Making".
M. D. Lerner, 6/12/85, "An Overview of the DADO Parallel Computer".
S. J. Stolfo, 6/6/85, "DADO: A Parallel Computer for Artificial Intelligence".
S. J. Stolfo, 10/84, "The DADO Production System Machine".
S. J. Stolfo, 8/84, "DADO: A Parallel Processor for Expert Systems".
S. J. Stolfo, 1/83, "Architecture and Applications of DADO: A Large Scale Parallel Computer for Artificial Intelligence".
S. J. Stolfo, Apr. 1981, "Specialized Hardware for Production Systems".
S. J. Stolfo, 8/15/84, "Five Parallel Algorithms for Production System Execution on the DADO Machine".
S. J. Stolfo, 4/85, "More Rules May Mean Faster Execution".

(List continued on next page.)

Primary Examiner—Gareth D. Shaw
Assistant Examiner—Viet Q. Nguyen
Attorney, Agent, or Firm—Brumbaugh, Graves, Donohue & Raymond

[57] ABSTRACT

A parallel data processing system is formed as a binary tree of data processing elements. Each of the elements includes an interface unit having registers coupled to registers in the interface unit of adjacent higher and lower order elements in the binary tree. Signals comprising instructions and data for processing in the elements are broadcast to the elements via the coupled registers for simultaneous processing in the elements. Processing results are compared and reported via the registers in a resolve/report operation.

7 Claims, 6 Drawing Sheets

OTHER PUBLICATIONS

S. J. Stolfo, 4/85, "A Simple Preprocessing Scheme to Extract and Balance Implicit Parallelism in the Concurrent Match of Production Rules".

T. Ishida, 10/84, "Towards the Parallel Execution of Rules in Production System Programs".

D. P. Miranker, 4/84, "Performance Estimates for the DADO Machine: A Comparison of TREAT and RETE".

A. Lowery, 10/84, "LPS Algorithms".

A. Lowery, 3/84, "LPS Algorithms: A Detailed Examination".

A. Lowery, 3/84, "LPS Algorithms: A Critical Analysis".

S. Taylor, 2/1/84, "Logic Programming Using Parallel Associative Operations".

S. J. Stolfo, 1/1/85, "On the Design of Parallel Production System Machines: What's in a LIP?".

T. Ishida, 3/28/84, "Simultaneous Firing of Production Rules on Tree Structured Machines".

S. J. Stolfo, 3/15/82, "DADO: A Tree-Structured Machine Architecture for Production Systems".

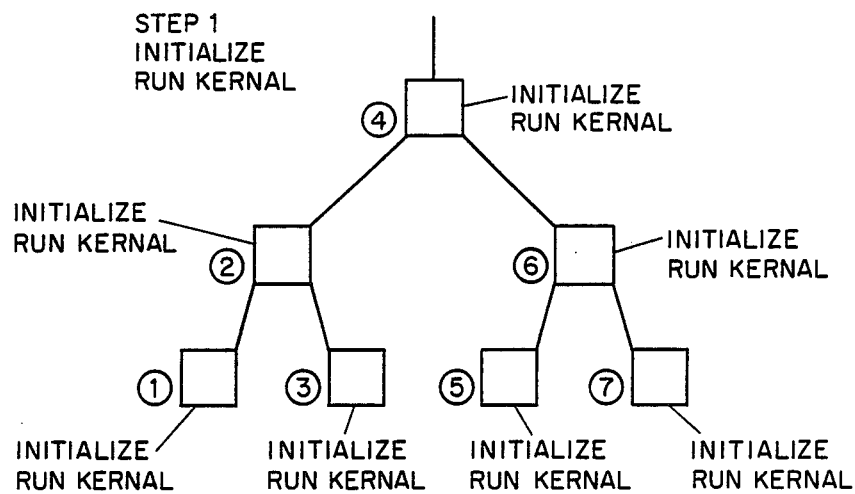
FIG. 9A
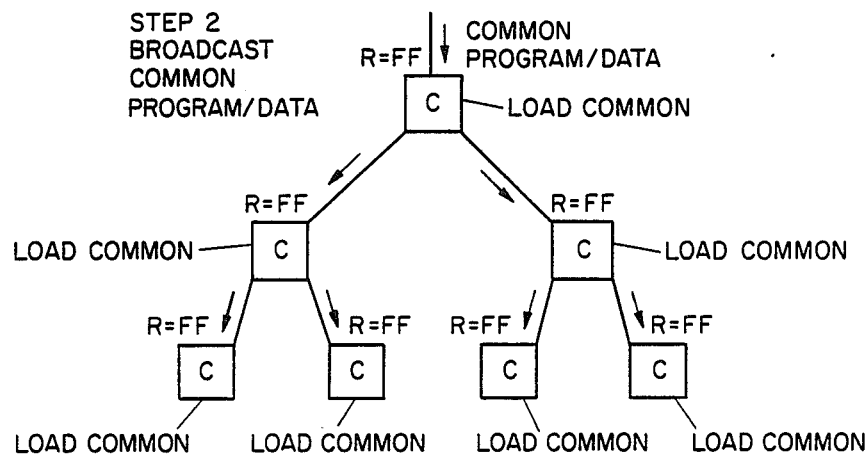
FIG. 9B
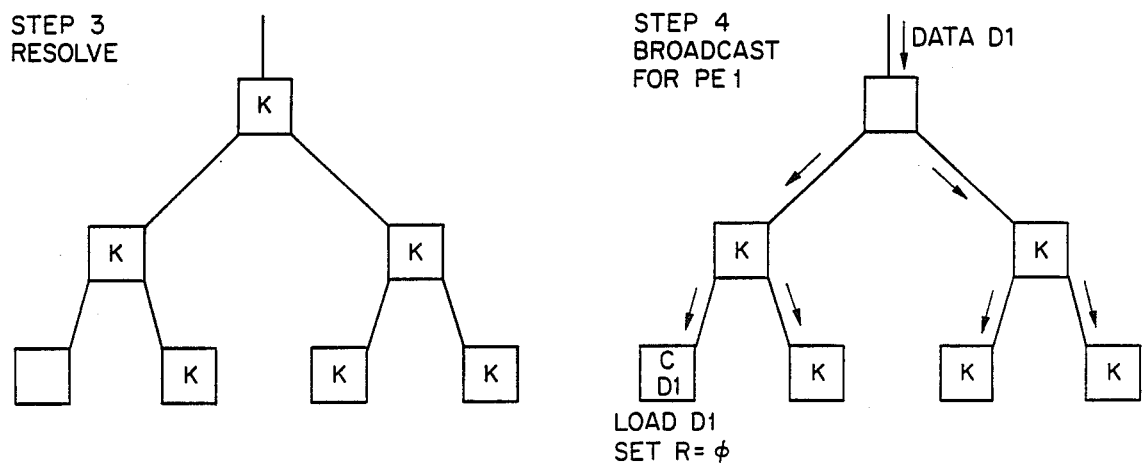
FIG. 9C
FIG. 9D

4,843,540

PARALLEL PROCESSING METHOD

BACKGROUND OF THE INVENTION

This invention relates to parallel processing systems, and particularly to such systems which use a binary tree of data processing elements for the parallel processing of data by computer techniques.

It is an object of the present invention to provide a parallel processing system and a method of using such a system which provides an efficient approach for disseminating programs and data to the processing elements of the system, to efficiently and simultaneously process such data, and to efficiently report the results of the parallel processing to a host data processing system.

It is a further object of the present invention to provide such a parallel processing system which is capable of executing production system programs, wherein processing operations use programs and/or data which are determined by the results of previous processing operations.

SUMMARY OF THE INVENTION

In accordance with the invention there is provided a data processing system which comprises a binary tree of data processing elements. Each of the data processing elements includes a processing unit, such as a single chip computer, and an interface unit, which is coupled to the processing unit. The interface unit includes registers which are coupled to transmit and receive data from the interface units of adjacent data processing elements in the binary tree. The processing unit includes data communication ports which are also coupled to transmit and receive data from data communications ports on processing units of adjacent data processing elements.

In accordance with the invention there is provided a method useful in such a data processing system. The method is for selecting one of the data processing units and comprises setting selected values in output registers of all the interface units, comparing, in the registers in each higher order data processing element, the selected values in output registers for the adjacent lower order data processing elements with the selected value in the output register of the higher order data processing element to select according to a selected logic order one of the processing units having a value with a desired characteristic. The method includes the further step of inactivating the non-selected data processing elements and substituting the selected output register value of the selected data processing element for the output register value of the higher order data processing element. The comparing, inactivating and substituting steps are repeated until all but one of the processing elements of the system are inactivated.

In accordance with the invention there is also provided a method for processing data in a series of operations wherein the results of earlier operations are used to vary the parameters of later operations. The method comprises the steps of providing a binary tree of data processing elements each data processing element including registers coupled to corresponding registers in adjoining processing units in the binary tree. Program instructions and data are supplied to the data processing elements as required for parallel processing according to a first operation. Data is processed simultaneously in the data processing elements according to the first operation and a resultant value is provided to the registers. The method further includes a step of comparing the resultant values in the registers to identify the data processing element having a most favorable resultant value, and providing further programs and/or data to the data processing elements for a second operation. The further programs and data are dependent on the most favorable resultant value. Data is then simultaneously processed in the data processing elements according to the second operation and a resultant value is provided to the registers. The resultant values are compared in the registers to identify the data processing element having the most favorable resultant value for the second operation.

In accordance with the invention there is provided a method for providing signals representing instructions or data to the data processing elements in such a data processing system. All of the data processing elements in the binary tree are initialized under control of kernel software in the data processing elements. Common signals are broadcast via the coupled registers to all of the data processing elements and stored in the memory of all of the data processing elements under control of the kernel software. Thereafter the data processing elements are selected in sequence in accordance with the state of one of the registers in each of the data processing elements and individual signals are broadcast to all of the data processing elements by the coupled registers. The individual signals are to be stored in the memory of the selected data processing element.

Further in accordance with the invention there is provided a method for processing data in such a data processing system. All of the data processing elements are initialized under control of kernel software. Common signals representative of instructions for a utility program are broadcast to all of the data processing elements by the coupled registers and stored in the memories of all of the data processing elements under control of the kernel software. The data processing elements are selected in sequence in accordance with the state of one of the coupled registers and individual signals are broadcast to all of the data processing elements by the coupled registers and stored in the selected element. The data processing elements are operated concurrently using the program instruction and data included in the common and individual signals and a resultant value is stored in the one register.

For a better understanding of the present invention, together with other and further objects, reference is made to the following description taken in conjunction with the accompanying drawings and its scope will be pointed out in the appended claims.

DESCRIPTION OF THE INVENTION

Figure 1:
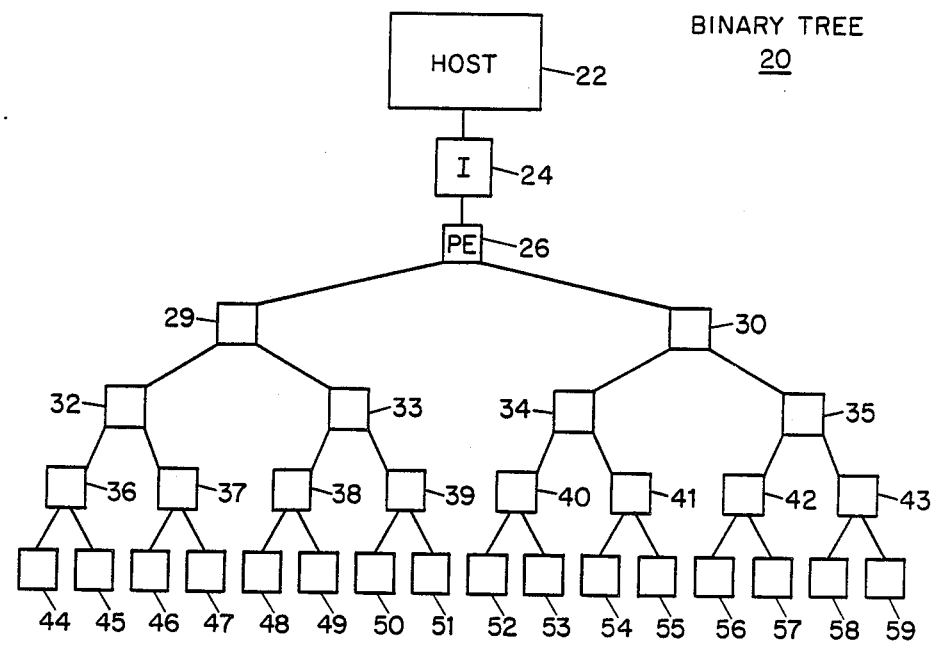
FIG. 1 is a block diagram of a processing system comprising a binary tree of identical processing elements.

FIG. 1 shows a parallel processing system 20 which consists of an arrangement of data processing elements 26 through 59 connected to a host computer 22. The data processing elements 26 through 59 are arranged in a binary tree and the processing system 20 of FIG. 1 includes 31 individual data processing elements. The root data processing element 26 is connected to host computer 22 through a host interface 24. The processing elements 26 through 59 are arranged in a binary tree with processing element 26 at what will be called the "root" or highest order position of the tree and processing elements 44 through 59 at the "leaves" or lowest order position of the tree.

While the binary tree 20 as illustrated in FIG. 1 includes 31 processing elements, the data processing system may use any size binary tree, and a prototype system has been constructed with 1,023 identical processing elements arranged in such a binary tree. This prototype system uses a VAX 11/750 computer as a host.

A typical element in the binary tree, such as data processing element 32 has a higher order parent data processing element in the tree i.e. data processing element 29 and two lower order child data processing elements 36, 37. The lower order data processing elements 36, 37 will be referred to herein respectively as the left child and right child data processing elements. Thus data processing element 36 is the left child of data processing element 32 and data processing element 37 is the right child of data processing element 32. Data processing element 29 is the parent of data processing element 32.

It may be noted that one of the characteristics of the binary tree 20 as illustrated in FIG. 1 is that it includes sub-sets which are also binary trees. Accordingly, there is a binary tree with data processing element 32 as its root, which includes data processing elements 36, 37 and 44 through 47. Likewise a binary tree is formed with data processing element 33 as a root, and includes data processing elements 38, 39 and 48 through 51. This arrangement enables variations in the data processing operations wherein the sub-binary trees of binary tree 20 may act separately as separate processing systems acting in parallel.

The present invention contemplates identical data processing elements, independent of their location within the binary tree. This facilitates easy construction, interconnection and replacement of the data processing elements.

In connection with parallel processing of data, one of the significant considerations is the "overhead" processing time which must be utilized for purposes of supplying the various elements in the parallel processing system with instructions and data to be processed, as well as the overhead time required to collect the results of computations performed in the various distributed data processing elements. As will be explained further the system of the present invention provides significantly reduced "overhead" processing time for these functions. In addition the method contemplated by the present invention provides for identical construction, wiring and programming of the data processing elements in the system, to render them interchangeable, and still provide the capability for unique programming of the individual data processing elements.

Figure 2:
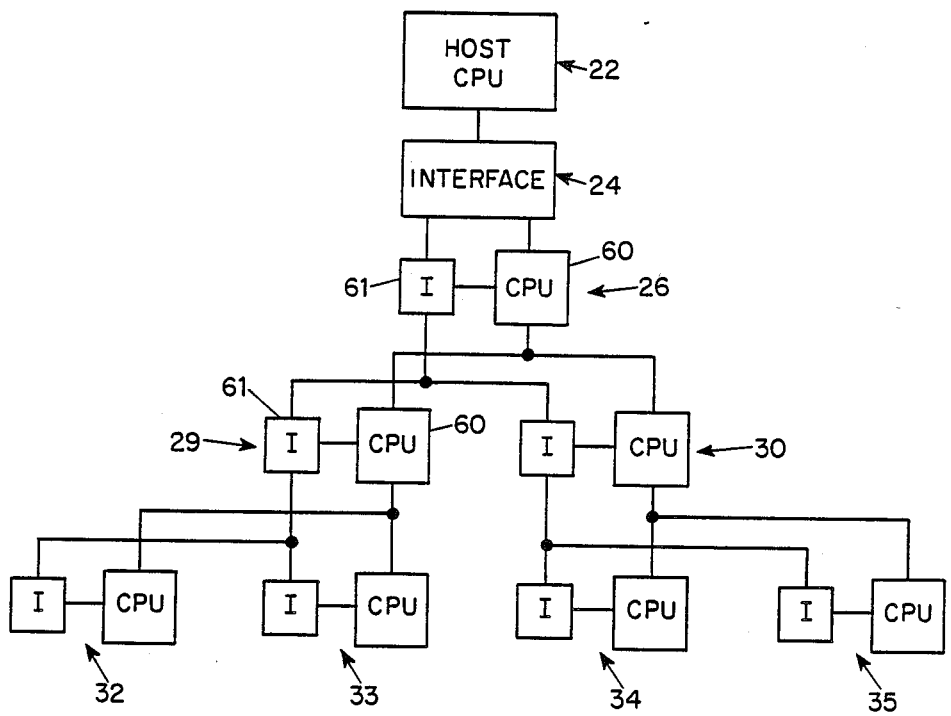
FIG. 2 is a partial block diagram of the processing system of FIG. 1 showing the binary tree system of the present invention in greater detail.

FIG. 2 illustrates in greater detail the interconnection of data processing elements 26 and 29 through 35 of the processing system 20. Each of the data processing elements includes a central processing unit 60 and an interface unit 61. The central processing unit includes a one chip microcomputer and a selected amount of read only memory and random access memory. The read only memory includes a program, which shall be referred to as the "kernel" program, which provides for initialization and overall operation of the processing unit in each data processing element. The random access memory associated with each of the processing elements provides memory space for program instructions and program data required for the data processing operation to be performed. The interface unit 61 is of special design and is described in detail in commonly owned copending application Ser. No. 902,547 of Salvatore Stolfo and Daniel Maranker, entitled Binary Tree Parallel Processor filed concurrently herewith. As is pertinent to this application portions of the interface unit 61 will be described in further detail. Interface unit 61 includes a series of registers and logic elements for performing certain functions pertinent to the methods of this invention. Certain of the registers of interface unit 61 are memory mapped for transfer of instructions and/or data and control signals to and from central processing unit 60 and its associated memory.

A significant feature of the processing system 20 is the fact that there are two independent connections between each of the data processing elements and its parent and child data processing elements. Accordingly as illustrated in FIG. 2 data processing element 29 has a connection from its interface unit 61 to the interface unit of its parent data processing element 26. Likewise interface unit 61 of data processing element 29 is connected to the interface unit 61 of its left child data processing element 32 and its right child data processing element 33. The interconnection between the interface units 61 is a register-to-register interconnection which provides for a rapid "broadcast" operation and a "resolve/report" operation in accordance with the present invention, both of which will be further described in detail.

In addition to the interconnection of interface unit 61 the central processing units 60 of each of the data processing elements in the processing system 20 are interconnected with the central processing units in the parent and child data processing elements as illustrated in FIG. 2. Accordingly central processing unit 60 of data processing element 29 is connected to the identical central processing unit 60 of data processing element 26 and to the central processing unit 60 of its left child data processing element 32 and right child data processing element 33.

Figure 3:
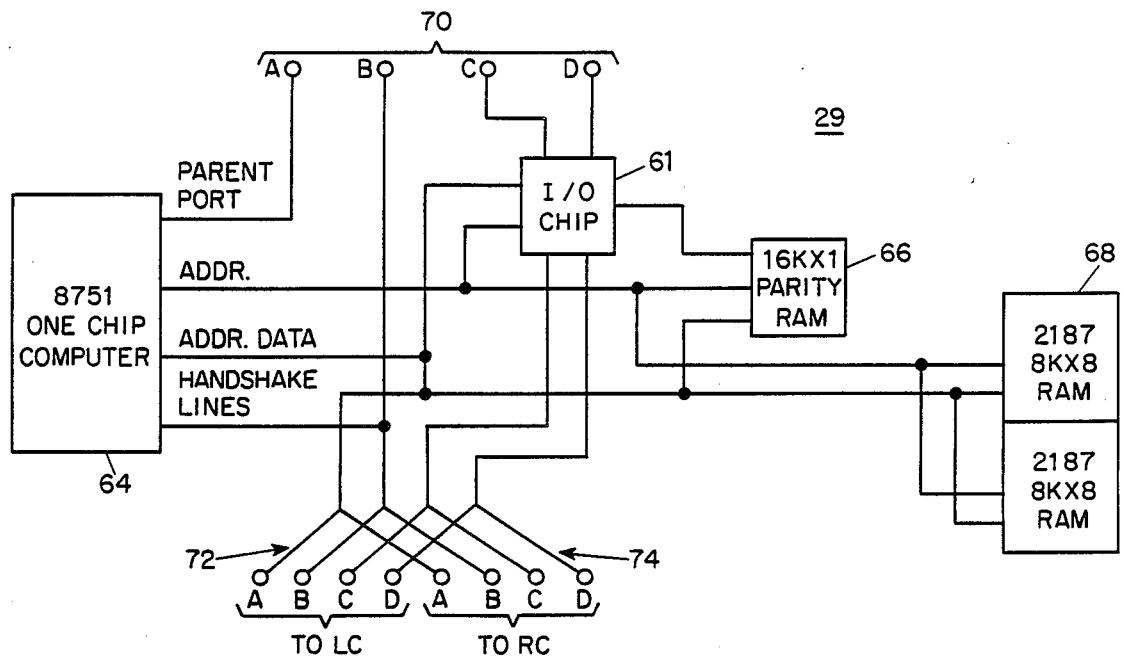
FIG. 3 is a block diagram illustrating in greater detail the arrangement of each of the data processing elements used in the FIG. 1 and FIG. 2 processing systems.

FIG. 3 shows in somewhat greater detail a block diagram of a single data processing element 29 useful in the processing system 20 of the present invention. As illustrated in FIG. 3 the data processing element 29 includes interface unit 61 which is an input/output chip of special design as described in the aforementioned copending application. In addition there is provided a single chip computer 64, which in this case is an 8751 processor. A parity memory 66, comprising 64K1 S-RAM, is provided and 16K random access memory 68 consisting of two 8K×8 S-RAM chips is also provided as a working memory for the single chip computer 64. Computer 64 with its associated memories forms central processing unit 60.

As illustrated in FIG. 3 there are shown four terminals A, B, C, and D by which data processing element 29 is connected to its parent and child data processing elements. Accordingly there are shown four terminals A, B, C, and D at connection 70 for connection between data processing element 29 and its parent data processing element 26. Likewise, four terminals A, B, C, and D are provided at connection 72 for connection to left child data processing element 32 and four terminals A, B, C, and D are provided at connection 74 for connection to right child data processing element 33. It should be understood that the terminals A, B, C, and D may each include one or more pin interconnections. Accordingly a parallel port, labeled "parent port" of 8751 computer 64 is connected through 8 pin terminal 70A to terminal 72A of the par·nt data processing element and thus to the address/data port of the single chip computer 64 in the parent data processing element. Terminals B at each connection is used to provide handshake status lines between the computers in the adjacent data processing elements. Terminals C of connections 70, 72 and 74 are used to provide data interconnection between the interface input/output chips 61 in the parent and child data processing elements and terminals D are used to provide by control connections between the input/output chip 61 in the parent and child data processing elements in the binary tree.

The arrangements illustrated in FIGS. 2 and 3 under which data processing elements are coupled to their parent and child data processing elements by interconnections through the interface unit 61 and by direct connections of the central processing units 60 provides multiple capability for communications on the binary tree. In a typical application it is desireable to load each of the data processing elements with program instructions and program data and also to provide the data processing elements with data to be processed or instructions to be followed during the processing operation. For purposes of communicating from the host computer to the data processing elements, the interface unit 61 are primarily used. The arrangement of the interface unit 61 for the downward communication from the host computer is by means of coupled registers and serial data streams which provide relatively rapid communications in the binary tree without operation of the central processing units 60 except for loading of data into memory. The process of downward communication in the binary tree is herein referred to as the "broadcast" operation. The broadcast operation can originate at the host computer, the root processing element 26 or one of the lower order data processing elements to provide multiple parallel operation using different parts of the binary tree. It is possible, for example, to simultaneously broadcast instructions or data from data processing elements 32, 33, 34 and 35 to the sub-binary trees formed of data processing elements connected respectively below these data processing elements for purposes, for example, of providing redundant calculations to assure accuracy or for purposes of doing parallel computations on different data sets simultaneously.

In order to provide for various data processing capabilities, each data processing element can function independent of its parent data processing element or in an operation which requires constant connection to its parent element. When functioning independent of its parent element the data processing element can act as a root element for a sub-binary tree formed by the lower order data processing elements connected below it.

One form of data processing operation contemplated for the processing system 20 is classified as a "membership" problem. This problem is a form of decomposable searching problems wherein the system must answer inquiries of whether an object X is included in a set of objects F. To perform this problem on the processing system 20 the system would provide each data processing element with a set of instructions and a set of program data which comprises an arbitrary subset of F. The system can then operate by providing the unknown operating data X to all the data processing elements to compare data X with its own subset of F. The results of these comparisons are then provided to the root data processing element and reported to the host. In performing the operation, the system can provide a series of such operations on a set of unknown data $X_1$, $X_2$, . . . etc.

A similar form of decomposable searching problem is to compare an unknown point to a set of points to find which point is the nearest neighbor. In this problem the data representing the set of points can be distributed to the data processing elements and for each unknown point $X_1$, $X_2$ etc. the data processing elements compute the distance to the data points subset stored in the local memory.

In connection with the decomposible searching problem the data processing elements operate in a single instruction multiple data (SIMD) mode, wherein the data processing elements contain multiple subsets of the data set F and each operate on the same instruction (compare X to F). The data processing elements remain logically connected to the root data processing element to receive inquires (as simple instructions or unknown data) and to report the results of the data processing operation.

In other operations it may be desireable to provide the various data processing elements with different instruction sets to be independently computed using their own set of data in an operation involving unknown data X. In performing this type of operation the data processing elements are logically connected in SIMD mode for distribution of unknown data X, logically is connected to perform their own set of instructions, then logically connected to report the results. The logical disconnection state of a data processing element from its parent during the data processing is called multiple instruction, multiple data (MIMD) mode.

A data processing element operating in the MIMD mode can act as a root data processing element for its lower order descendants which will then operate in the SIMD mode.

Figure 4:
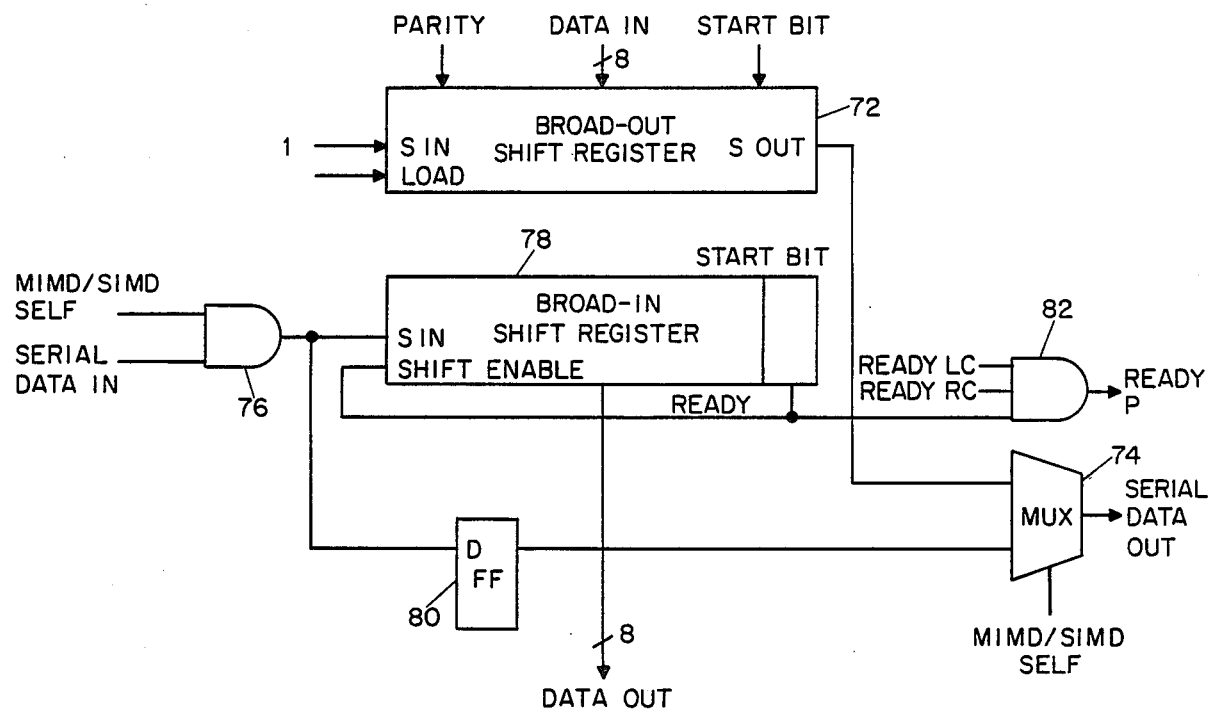
FIG. 4 is a block diagram illustrating the arrangement of a portion of the data processing element of FIG. 3 used in connection with the broadcast operation of the data processing system of the present invention.

While the interface unit is fully described in the referenced copending application, portions of the unit are illustrated in FIG. 4 for purposes of describing the broadcast operation.

The broadcast operation originates in host interface 24 or in a higher order data processing element operating in the MIMD mode. The portions of the interface unit illustrated in FIG. 4 include, a broadcast output shift register 72, a broadcast multiplexer 74, AND gate 76, broadcast input shift register 78, flip-flop 80 and AND gate 82. Assuming a broadcast operation is originating in the illustrated data processing element, clock signals are continually being supplied to broadcast out shift register 72. The serial input to this shift register is tied to a "one" condition so that the shift register is constantly providing an output of ones at its serial output port. When a byte of 8 bits of data is to be broadcast, the data is loaded into the broadcast out shift register as a parallel 8 bit byte. In addition, a parity bit and a start bit, consisting of a "zero", are loaded with the data byte. The shift register then shifts out a data stream consisting of the start bit, 8 bits of data and the parity bit through the serial output port to multiplexer 74. Since the data processing element must be operated in the MIMD mode, multiplexer 74 is connected to provide the output of shift register 72 to the serial data output and thereafter to the lower order data processing elements. When operating in the MIMD mode and originating a data broadcast, the signals supplied to the serial data in AND gate 76 are disconnected so that the data processing element does not respond to broadcast signals from its ancestors.

The broadcast-out shift register 72 is not loaded with a data byte until the data processing element received "ready" signals from its left child and right child. As will be indicated below, these signals are not provided until all lower order data processing elements signal a "ready" condition.

In the next lower order processing elements, the serial data is supplied to the serial data input port of AND gate 76. These processing elements must be operating in the SIMD mode to receive broadcast data from their parent data processing element, and accordingly the upper input to AND gate 76 is in a "one" condition, and the serial input data stream is provided to broadcast-in shift register 78 in serial form. Prior to a broadcast the input data stream is a series of "ones" originating in the serial input port of the broadcast-out shift register 72 originating the broadcast. Accordingly the last bit in the shift register 78 prior to reception of a data byte is in a "one" condition, and the shift enable of a broadcast-in shift register 78 is in an enabled condition. When the start bit of a data byte reaches the end of the shift register 78, the shift enable signal goes to a zero condition and shift register 78 is fully loaded and shifting is stopped. The zero start bit is also supplied to AND gate 82 which disables the ready signal provided to the parent data processing element. The data processing element originating the broadcast will not transmit another stream of data until it receives a ready signal from AND gate 82 of its two child processing elements.

The serial data stream from the output of AND gate 76 is also provided to flip-flop 80 which provides a one clock pulse delay in the data stream prior to supplying the data stream to output multiplexer 74. Since the data processing elements receiving broadcast data are in the SIMD mode, the serial data stream from D flip-flop 80 will be provided to the output of multiplexer 74 for transmission to lower order data processing elements. The data stream therefore suffers a one clock pulse delay for each order of data processing elements through which it passes.

As each data byte is provided to the broadcast-in shift register and the start bit is positioned in the last element of the register 78 the register contents may be transferred as data to the data processing element or its memory in parallel form. As the data elements are transferred out, "ones" are loaded into the broadcast-in shift register 78 to change the start bit position to a "one", thereby re-enabling the shift enable of register 78 and providing a ready signal to be transmitted upward to the parent data processing element through AND gate 82. The ready signal is not transmitted until ready signals are received from the child elements of each individual data processing element. Accordingly a ready signal is conveyed up to the MIMD root data processing element only after the data byte has been transmitted and shifted into all of the data processing elements in the binary tree. The arrangement of the broadcast registers as illustrated in FIG. 4 provides a relatively small, one clock pulse, delay between transfer of data for each stage of the binary tree. All of the data processing elements operate on the same clock at a rate of about 12 MHz. The arrangement enables changing of the data processing element from the SIMD to the MIMD mode, so that groups of data processing elements can be disconnected from their parent data processing elements for independent and simultaneous operation, individually or with their own lower order elements in sub-trees of multiple data processing elements.

Another important functional aspect of the processing system of the present invention is the resolve and report operation. Referring to the binary tree 20 illustrated in FIG. 1 it is assumed that each of the data processing elements in the system 20 has been loaded with program instructions and then provided with program data. In a typical operation the host processor would provide data to be processed, in the broadcast mode, to all of the data processing elements for simultaneous processing. The data to be processed may be, for example, an unknown signal (such as voice) in digitized form which is to be compared to known signal samples (templates) which are stored as program data in the various data processing elements of the binary tree. After the computation has been done simultaneously by all the data processing elements, it is necessary to find out the most favorable result of the data processing. This can be done by the operation which is herein called "resolve" and "report".

The results in the data processing elements are compared to each other while they are passed up to the root of the binary tree through the registers in the interface units. In a typical resolve operation, the interface units in the first higher order level of system 20, comprising data processing elements 36 through 43, would each compare the results reached in their respective central processing units with the results reached in their child data processing elements. Accordingly, the interface registers of data processing element 36 compares the result from its own central processing unit with the results reached in data processing elements 44 and 45. Likewise the interface unit of data processing element 37 compares the results reached by its own central processing unit with the results reached by data processing elements 46 and 47. In the next step of resolve the interface units in data processing elements at the next higher level would again compare their own result with the results reached by the lower order data processing elements. In this step the most favorable results reached in the lowest and second lowest level data processing elements are provided by data processing elements 36 and 37 to data processing element 32 for comparison with the result reached in that data processing element. The resolve continues until the best result in all of the data processing elements reached in the binary tree is reported to the host processor. In addition to reporting the best result reached in the binary tree, the resolve function additionally provides signals to be generated for each data processing element, which indicates whether that data processing element is the one which has generated the most favorable value. This signal is called the "kill" signal for convenience and results in the killing or inactivation of all processing elements except the one processing element which has provided the winning value. The winning value may be a maximum value, a minimum value or any other criteria which can be easily determined in a register. As will be further described, the logic circuitry used for the resolve operation, which is built into the interface unit, has a selected order for resolution of equal result values. The resolve operation is not only used for reporting the results of the calculation, but as will be further described, is also used for purposes of enumerating the processing elements and identifying processing elements which are to receive individual processing element instructions during a broadcast operation.

Figure 5:
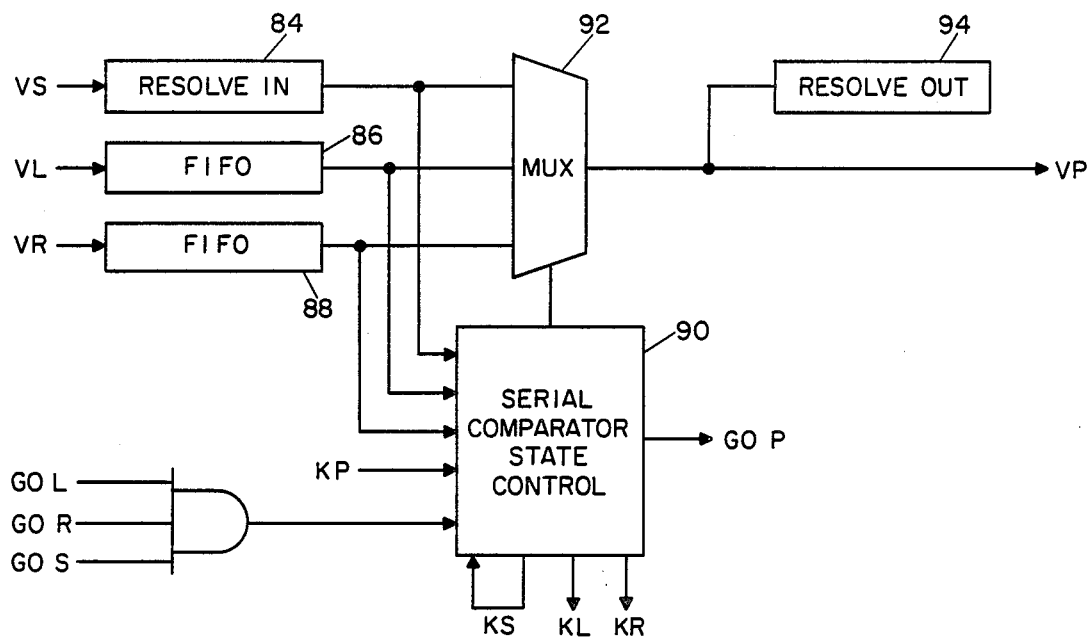
FIG. 5 is a block diagram of a portion of the data processing element of FIG. 3 used in connection with the resolve operation in accordance with the present invention.

FIG. 5 is a block diagram showing portions of the interface unit which are used in connection with the resolve operation. The block diagram of FIG. 5 shows input registers 84, 86 and 88. Input register 84 is connected to receive the result of a calculation or other data transferred from the central processing unit associated with the particular interface unit containing the illustrated registers. Register 86 and 88 are connected respectively to receive the output value from the left child and the right child data processing elements. A serial comparator and state controller 90 is provided to compare the values in registers 84, 86 and 88 in a bit-by-bit serial comparison with the most significant data bit being compared first. A typical comparison is to determine the maximum or minimum value of the three values in registers 84, 86 and 88. The serial comparator additionally contains circuitry arrangements to resolve ties in the values as will be further described. Serial comparator and state controller 90 generates kill signals according to the comparison values and also controls multiplexer 92 to transfer the most favorable value to the output register 94 and the parent processing element.

For purposes of illustration it is assumed that the most favorable value is a maximum value of a particular calculation which has been performed by all of the data processing elements using data stored in those data processing elements. For example, there might be a correlation calculation between supplied unknown data X and data F stored at each processing element. The value which results would be maximum for maximum correlation of the unknown data with the data stored in each data processing element. Assume that the processing element associated with the register shown in FIG. 5 has developed a value of 10, the left child has developed a value of 8 and the right child has developed a value of 5. In this situation the serial comparator 90, upon comparing these values would determine that the processing element associated with that interface unit has won the comparison, and it would generate signals to the left child and the right child to "kill" those processing elements for purposes of this resolve operation. These are indicated as the KL and KR signals. The KS (kill self) signal would not be generated in this case. Multiplexer 92 is then controlled to pass the winning value stored in register 84 to output register 94 and to transfer that value to one of the input fifo registers in the parent processing element for further comparison. In the event the value passed to the parent by the particular processing element loses in a further comparison, a kill signal is generated by the parent and provided to serial comparator and state controller 90 as signal KP.

Since it is possible that the computations being made in various processing elements will take different amounts of time it is necessary to assure that the calculations have been completed before undertaking the resolve operation at each step in the binary tree. Accordingly, serial comparator and state controller 90 must receive go ahead signals from its left child and right child data processing elements and its own central processing unit to indicate that computations have been completed and the values to be compared have been stored in input registers 84, 86 and 88. When the resolve operation is completed state controller 90 provides a go signal to its parent processing element to continue the resolve operation at a higher level.

Figure 6:
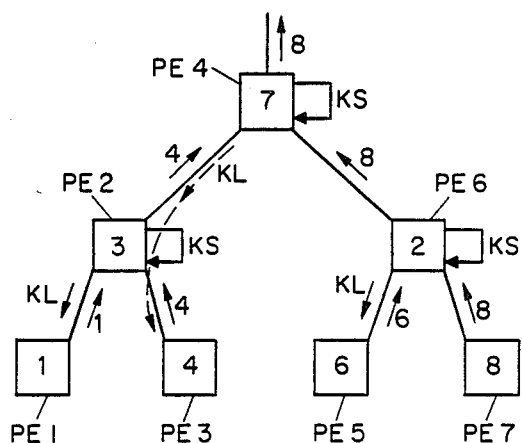
FIG. 6 is a simplified diagram illustrating the resolve operation of the present invention.

FIG. 6 illustrates a typical resolve operation which compares resulting numbers in various data processing elements of a small binary tree to determine the maximum value computed. In FIG. 6 the values generated for each of the data processing elements PE1 to PE7 are indicated in the processing element boxes. The illustration is for a relatively small binary tree of 7 processing elements, but illustrates the manner in which the resolve operation takes place. A first comparison takes place in processing element PE2 to compare the results reached in PE1, PE2 and PE3. The results of this comparison indicate that PE3 is the winning processing element and accordingly a KL signal is sent to PE1 to deactivate that processing element and a KS signal is generated to deactivate processing element PE2. Simultaneously PE6 does a comparison of the results reached in PE5, PE6 and PE7. Again a KL signal is generated to deactivate PE5 in a KS signal is generated to deactivate PE6. The maximum value results reached in PE2 and PE6 are forwarded to PE4 for a final comparison. In PE4 a KS signal is generated to deactivate PE4 and a KL signal is generated and passed to PE2. The KL sent to PE2 is passed on by PE2 to deactivate PE3. As a result PE7, which contains the winning value of 8, is the only processing element which remains active. The result of the computation, "8", which is the maximum value determined, is placed in the output register of PE4.

Figure 7:
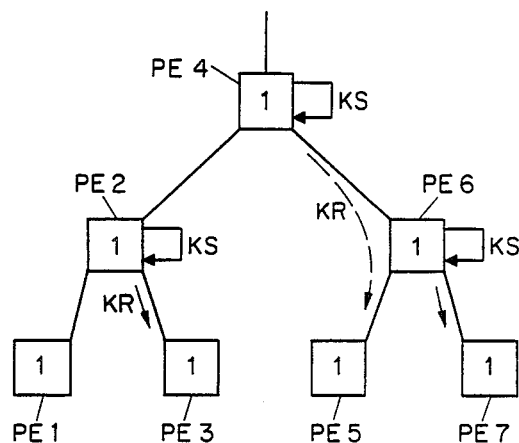
FIG. 7 is a simplified diagram illustrating the use of the resolve operation for enumeration of data processing elements.

FIG. 7 illustrates the manner in which the resolve operation handles ties in the output register values of the various processing elements. In FIG. 7 each of the processing elements has an output value of "one" in its output register thereby making a tie of all the processing elements. This type of resolve operation with identical values is used in connection with the processing system for purposes of enumerating the various identical processing elements. Referring to FIG. 7, the first resolve operation takes place in PE2. The logic of PE2 causes it to favor its left child in the event in a three-way tie and to favor itself over its right child. Accordingly, PE2 generates KS and K signals to deactivate PE2 and PE3. Likewise, processing PE6 generates KS and KR signals to resolve the tie in favor of its left child PE5.

PE4 viewing the equal results passed on by PE2 and PE6 generates a KS and a KR signal. The KS signal deactivates PE4 and the KR signal is passed down by PE6 to deactivate PE5. Accordingly, the result of the tie resolve operation illustrated causes deactivation of all processing elements except PE1.

Figure 8:
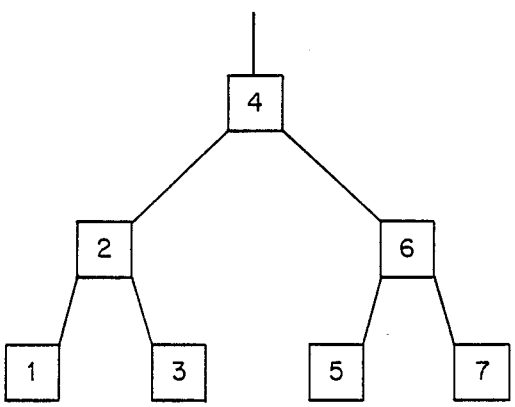
FIG. 8 is a simplified diagram illustrating the order of data processing element enumeration.

The tie resolution operation illustrated in FIG. 7 can be used in connection with supplying individual programs to the various data processing elements. Following the operation illustrated in FIG. 7 all data processing elements except PE1 have received a kill signal and are in an inactivated state. Signals representing program instructions and/or data which are intended to be provided only to PE1 may then be broadcast from the host interface. Since PE1 is the only active data processing element, only PE1 will operate to transfer these signals to its local memory. The individual instructions, once loaded, can be operated to cause PE1 to place its resolve out register in the zero condition. The resolve operation is then repeated and PE1 will be deactivated, since it has a zero condition output. On the second resolve operation all elements except PE2 will be deactivated. This process can be continued until the processing elements are supplied with individual program instructions and data in the order illustrated in FIG. 8. Set forth below are the logical equations used by each processing element in the resolve operation for maximum value:

VP = Maximum (VS, VL, VR)

KL = KP OR (VS > VL) OR (VR > VL)

KR = KP OR (VS > = VR) OR (VL > VR)

KS = KP OR (VS < = VL) OR (VS < VR)

FIG. 9 is a series of diagrams 9A through 9L which illustrate the operation of the data processing system of the present invention to perform a computation which involves parallel processing. It is assumed that the operation is of a type wherein each of the processing elements is provided with program instructions which are identical for all elements and also provided with program instructions and/or program data which are different for each of the processing elements. A program of this sort may involve, for example, analyzing signal samples of voice, acoustic, X-ray or radar signals, to compare the signal sample to signal samples associated with known parameters. For example, it may be desired to examine the signal characteristics of digitized voice signals to compare those signals with the signal characteristics known to be representative of various words (called templates). For purposes of doing such comparison each of the processing elements is provided with instructions for performing the comparison and each of the processing elements would be provided with a portion of the data bank (templates) which is to be used for comparison. After this loading has been achieved, data processing takes place as unknown signal information is provided from the host computer to the binary tree of data processing elements for simultaneous data processing on the unknown data in each of the data processing elements, using the individual program data resident in the data processing elements. Thus by simultaneous processing the unknown data can be compared to a large data bank of known data, and the best match of unknown data to the data bank can be identified.

The type of operation above described may be characterized as a "decomposable searching problem" wherein the known data can be decomposed into arbitrary subsets of known data, one or more of which is provided to each of the processing elements and therein compared against the unknown data. The system of the present invention is particularly adapted to such a decomposable searching problem, but more important is also adapted to perform what the inventor characterizes as a "almost decomposable searching problem" wherein a series of searching operations are used to compare the unknown data to known data, but the content or the approach to the comparison is changed in a subsequent data comparison operation. The change in the subsequent data comparison operation is dependent on the result of earlier operations. Thus there is no clear flow through of information, since the data bank being used for comparison purposes may be changed before a subsequent comparison operation takes place. This type of "almost decomposable searching problem" is characteristic of an expert production system. In an expert production system it is desirable to change the data bank of known information which represents the "expert", as knowledge is acquired through comparison of unknown information to the data bank of known information.

In the example illustrated in FIG. 9 the various parts of the system operation have been designated as follows: The letter C represents common program instructions (and possibly program data) which is identical in each of the data processing elements in the binary tree of data processing elements. The designation $D_i$ is used in connection with data or program instructions which are individual to each of the processing elements in the system. The combination of C and $D_i$ constitutes the program and program data for each processing element. In the example of a voice recognition system the data $D_i$ may represent templates representative of words to be recognized by the system. The common program C would represent the algorithm by which unknown data is compared to the templates. A designation M is used in connection with unknown data, which must be compared to the known data D resident in each of the data processing elements. The letter K is used for the processing element kill signal, which has been discussed in connection with the resolve operation and the letter R is used to designate the output register value which is used in the resolve operation.

Prior to operation of the system each of the data processing elements includes read only memory on which there is resident a set of kernel instructions, which are used for the initialization of the data processing element after power and clock pulses are supplied to the system and also used in connection with loading of the program instructions and data. In step 1 of FIG. 9A the system causes the initialization of each of the data processing elements and the kernel element is run. As a result of the operation of the kernel program the data processing elements and their respective interface units are prepared to receive and execute program instructions which follow in the broadcast mode from the host computer.

Step 2 shows the initial broadcast of common program instructions and common program data from the host computer into the binary tree of data processing elements. At this point all of the data processing elements are active and all of the processing elements receive and load this common program and common data. As a result of either the common program or the resident kernel software each of the data processing elements sets it output register for the resolve operation to a predetermined condition, for example, hexidecimal FF as illustrated in FIG. 9B.

Step 3 shown in FIG. 9C is the first resolve operation. As previously discussed ties are resolved such that PE1 is the only data processing element not placed in the "kill" condition. The other data processing elements are thereby operating but not responsive to signals broadcast from the root, and they do not load these signals or change their condition. Accordingly after the resolve operation of step 3 only PE1 is in condition to receive and load additional program instructions and/or data.

Step 4 illustrates the loading of additional program instructions and data into PE1. The program instructions and/or data D1 are broadcast as signals from the root in a manner identical to the broadcast of the common program instructions and data, except that only processing element PE1 is in a condition to load the signals. After loading of the signals D1, PE1 is caused to place its output register in the R=$\phi$ condition. This prevents further loading of PE1 following a resolve operation until all of the processing elements place their output register in the "zero" condition or further data processing operations take place.

Figure 9E:
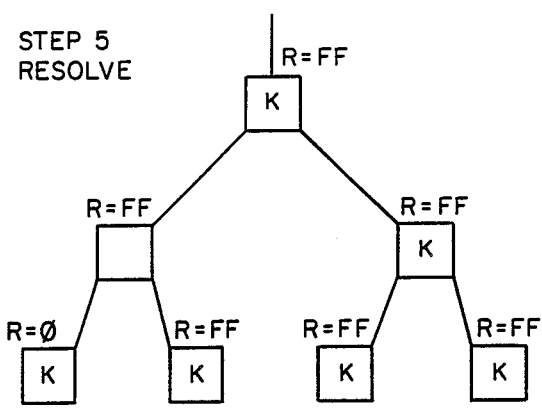
FIG. 9 is a series of simplified diagrams 9A through 9L, illustrating the sequence of operations of the data processing system in accordance with the present invention.
Figure 9F:
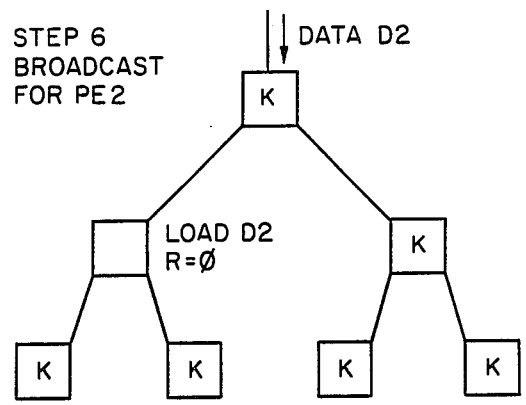
Figure 9G:
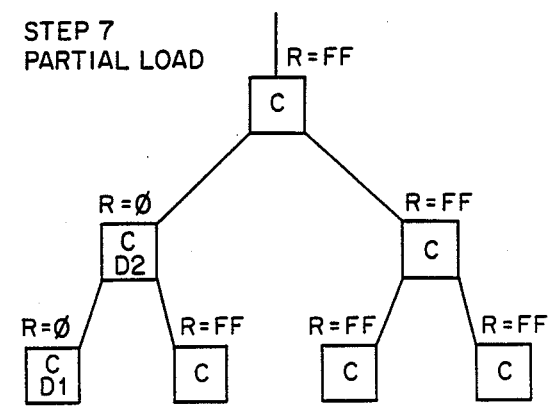
Figure 9H:
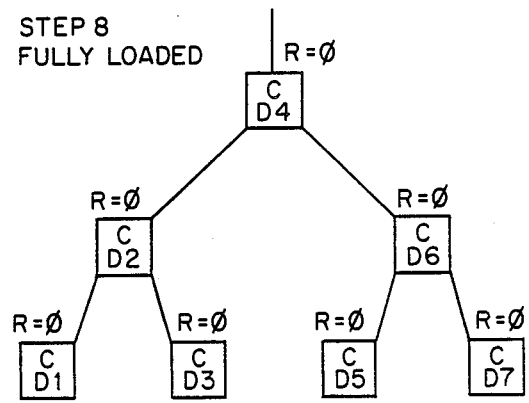

Step 5 illustrated in FIG. 9E shows a resolve operation which takes place following the loading of signals D1 in PE1. In this resolve operation all elements are killed except processing element PE2. Signals D2 to be loaded in PE2 are broadcast and loaded in PE2 as shown in step 6 in FIG. 9F. The R register of PE2 is set to R=$\phi$. Step 7 in FIG. 9G shows the condition of the processing elements in the binary tree after the loading of data D2 in data processing element PE2.

The loading of individual program instructions or data for each of the data processing elements continues until they are all provided with the required individual instructions and/or data. Step 8 shows the condition of the data processing system after all of the processing elements have been loaded with the common program instructions and data C and the individual program instructions and data D1 through D7. At this step each of the output registers of the data processing elements has been placed in the zero condition and the machine is ready to receive either instructions for operations to be performed on the data or data to be processed in accordance with the instructions contained in each of the elements.

Figure 9I:
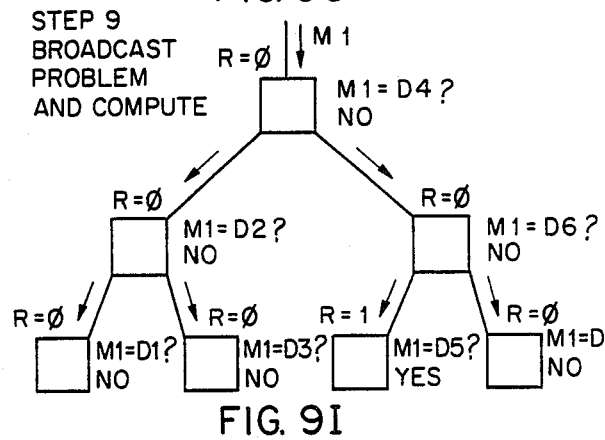

Step 9 shows further operation of the data processing system where actual data processing takes place. Unknown information to be processed, indicated by M1, is broadcast from the host computer through the host interface to all of the data processing elements. In the illustrated operation, step 9 in FIG. 9I, each of the data processing elements compares unknown data M1 to the stored data in its individual memory. This comparison takes place simultaneously in the various processing elements, and therefore a large number of comparisons can take place at once. The broadcast arrangement of coupled registers by which the unknown signal M is supplied to the processing elements through registers eliminates significant "overhead" time delay in sending the unknown information to the data processing elements for processing. After processing takes place, each of the processing elements places some indication of the results of the processing in its output register. As illustrated in FIG. 9I, each of the processing elements, after comparing unknown data M1 to the contents of its data memories D1 through D7 reach a result of either "yes" or "no". A negative result in the illustrated example causes the output register R to be placed in a zero condition. An affirmative caused the output register R to be placed in the "one" condition. In the illustrated example only processing element PE5 has its output register placed in the one condition showing a match between unknown data M1 and stored data D5.

Figure 9J:
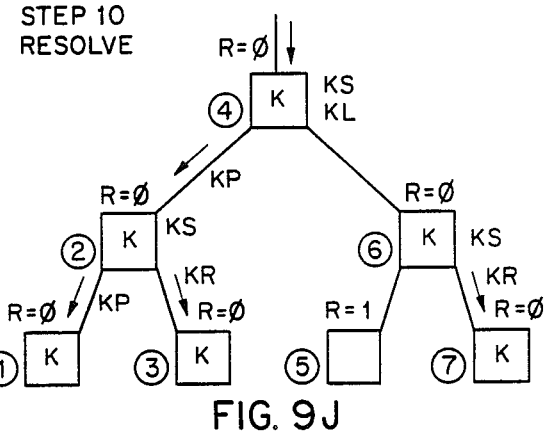

The illustrated example shows an identical match between data, but it is also possible that the comparison instructions find the degree of match, for example, between samples of an unknown voice signal which is broadcast as a sequence of data M1, and templates of known signals representing words which are stored in memory as a sequence of samples comprising data D1 through D7. The results in this type of operation may be correlation value, wherein the correlation values vary according to the degree of correlation between the unknown signal and the various known signals. In the case of a correlation computation, the value placed in each output register can represent the degree of correlation. In another instruction set the output register can be set to zero if there is no identical match between the unknown data M1 and the known data D1 to D7, and the output register would be set to an identifying number, which is not equal to zero, when the unknown data M1 matches some part of the known data. The identifying number identifies what portion of the data register, for example D4, correlates with the unknown data M1. Following computation as illustrated in FIG. 9I, a resolve operation is performed, as shown in FIG. 9J. In the illustrated example all of the processing elements except element PE5 are caused to be killed by the resolve operation, since all have their output register set to zero, except element PE5, which is set to one.

In the resolve operation illustrated in FIG. 9J, the output of processing element PE5, which is provided to the root would be the "one", which originated in processing element PE 4 and is passed upward during the resolve operation. This "one" signal indicates to the host computer that there has been an identical match in at least one of the processing elements, but the host has no indication which data processing element corresponds to the match or what portion of the data the match represents. To determine the meaning of the match which has been reported, a further step is required. In the event none of the processing elements found a match in its data memory the resolve operation would result in a zero being reported to the host computer representing that none of the data in the data memory bank correlated with the unknown data.

Figure 9K:
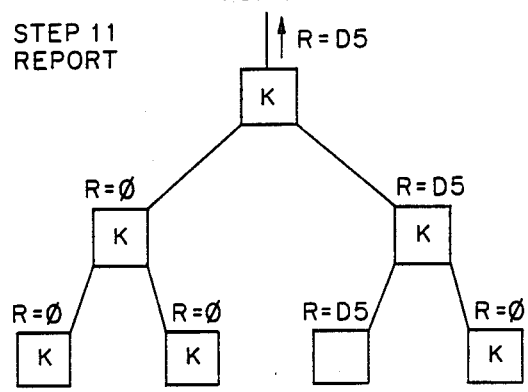

Step 11 in FIG. 9K shows a "report" operation being performed. In some operations the report may automatically take place by the relaying of the register value through the binary tree during the resolve operation. This register value may be sufficient for the operation being performed. In other operations it may be desirable to find out additional information about the results of the calculation, for example, the specific value of a correlation function and the identity of the data with which correlation has been identified as being most favorable. In this operation further steps in the data processing element instructions may cause the output register of the processing element PE5 which has not been killed and which has the most favorable result to be placed in a condition which would report that result. In step 11 the output register of processing element PE5 has been placed in a condition identified as D4 to represent an identification or report of the correlation results which is to be relayed to the host computer. During the report operation, once the register has been placed in the appropriate condition, a resolve operation is repeated and this report as a most favorable value compared to $\phi$ is passed upwardly through the resolve registers to the host computer as illustrated in FIG. 9K.

Figure 9L:
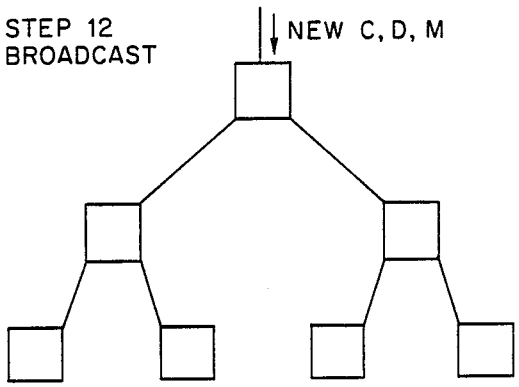
Figure 10:
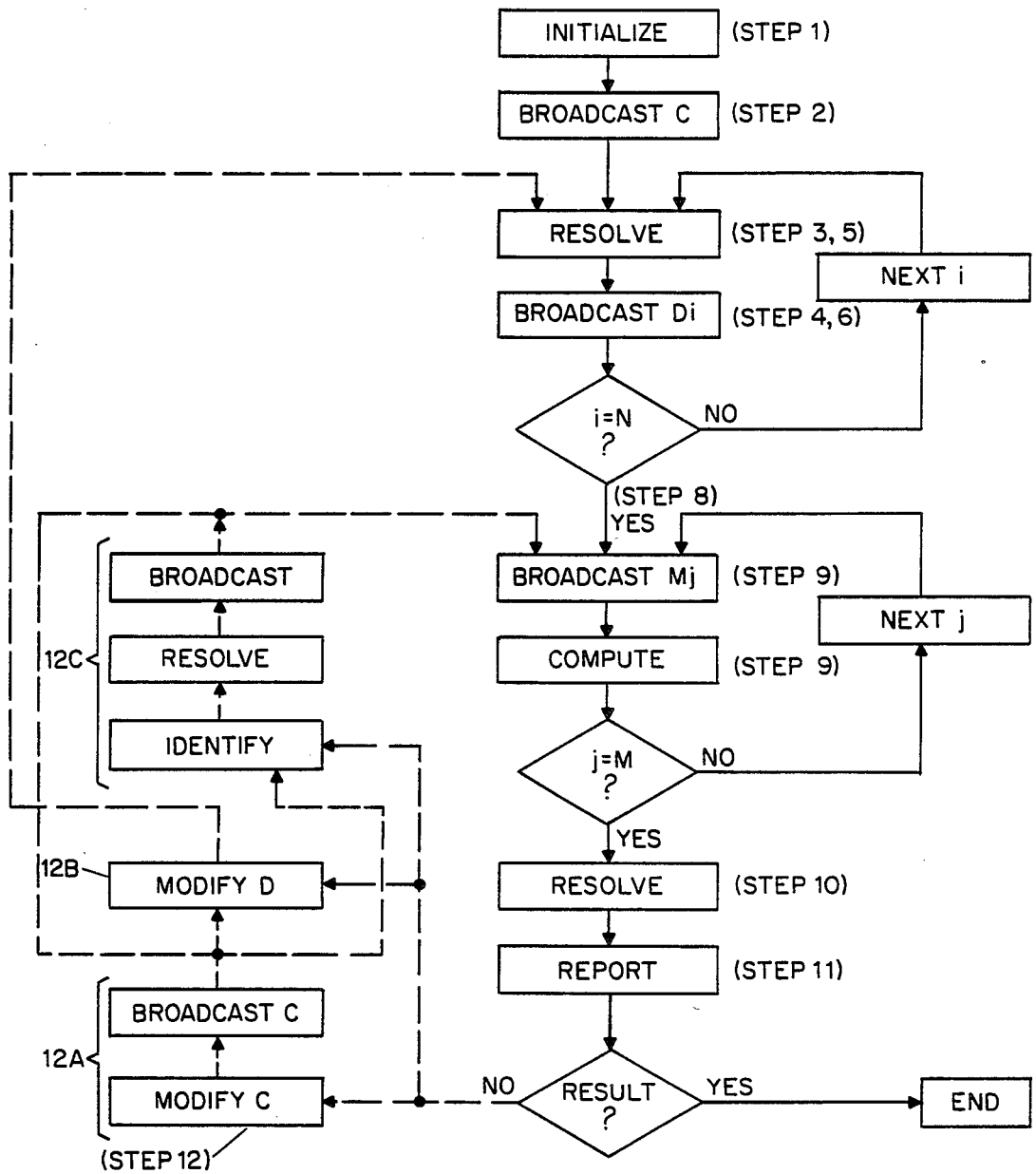
FIG. 10 is a flow diagram illustrating the data processing operation of the present invention.

In an "almost decomposable" searching problem the results of the first operation are used to change the instructions and/or data to be used for further operations as represented in Step 12, FIG. 9L. In an expert production system the first operation results can be used to add, delete or change data or instruction in the processing elements. This modification of data or instructions can be implemented in one of several ways according to the requirements of the production system. FIG. 10 is a program flow diagram showing steps 1 through 11 illustrated in FIG. 9 and alternative operations for step 12 for a production system.

If the same modification is to be provided to all data processing elements, the modification can be implemented by broadcasting instructions (step 12A, FIG. 10) for the modification to all data processing elements and causing the elements to simultaneously execute those instructions to modify the previously existing common program instructions C and individual program instructions or data D.

In the event the required modifications are individual to unique subsets of program data Di, the changes can be individually broadcast to the data processing elements by the enumeration and broadcast operation of steps 3 to 8 as described above. (Step 12B, FIG. 10). If the modification involves only the "winning" data processing element, modifications to the instructions and data in that processing element can be broadcast before clearing the kill signals of the previous operation.

It is also possible to "direct" modification signals to less than all the data processing elements by instructing a specific data processing element to identify itself in the resolve register. (Step 12C, FIG. 10). In this approach the original individual data Di would include unique identification data to be loaded in each data processing element memory. To identify a particular element the host can broadcast instructions to compare a broadcast number (corresponding to the desired data processing element) with the stored identification data and put the correlation output in the resolve register. The resolve operation will then disable all but the desired data processing element, which can then be loaded with instructions or data signals.

The system of the invention has been described with reference to applications wherein all data processing elements have different instructions and program data combinations. In some applications it may be desirable to provide identical program instructions and data to two or more data processing elements to provide redundancy for fault identification. This can be achieved by use of the MIMD/SIMD modes to sub-divide system 20 of FIG. 1 into sub-binary trees.

For Example, system 20 of FIG. 1 can be divided into four binary sub-trees with data processing elements 32, 33, 34 and 35 acting as root processing elements of the subtrees. Each of the data processing elements of each sub-tree must be loaded with program instructions and data. Common instructions can be broadcast from interface 24 and stored in all elements. Individual instructions and program data for the sub-tree can be loaded by the usual sequence, or can be simultaneously loaded in each sub-tree.

Assuming special "root" instructions are loaded in root data processing elements 32, 33, 34 and 35 by the host processor, the lower order data processing elements can be loaded by performing a resolve operation of the sub-trees in the MIMD mode, to inactivate all but one data processing element in each sub-tree (i.e., PE44, PE48, PE52 and PE56). The root element may then return to SIMD mode and pass instructions and/or data broadcast from host 22 for simultaneous loading in the four active data processing elements in each sub-tree. After loading the first set of four data processing elements, the sub-tree root elements can return to MIMD state to select and load the next data processing element in each sub-tree. The selection and loading of the data processing elements in each sub-tree by its respective sub-tree root element is carried out with each sub-tree operating independently in SIMD state.

Parallel operation can be performed on data broadcast from the host with the sub-tree root elements in SIMD state and individual resolve/report operations can be performed with the root elements in MIMD state. Data processing elements 26, 29 and 30 can compare the results in the parallel operation and provide them to the host.

Using four parallel sub-trees enables computational confidence even when there are as many as two errors in the system. The result would be selected to be the value computed by at least two of the four sub-trees.

As noted in FIGS. 2 and 3, the data processing elements in the binary tree are interconnected between the central processing units as well as through the interface registers used for broadcast and resolve/report operation. In most applications the interface registers provide the most efficient means to provide signals to the data processing elements and obtain the results of their operations. The broadcast and resolve/report operations can take place rapidly in a single instruction cycle of the machine and thus reduce significantly the machine time "overhead". In certain operations it may be necessary to communicate data between the central processing units directly. Typically this is required where the result to be supplied to the host is a combination of the operations performed by the various data processing elements rather than a minimum/maximum, AND or OR operation that can be supported in the registers. Where the results of the parallel data processing in the data processing elements must be combined, for example, a sum, the higher level data processing elements receive instructions to read the resultant values reached by their child elements and combine those results. These results are passed by the direct connections between the central processing units. Likewise, the higher order data processing elements can directly pass instructions or data to their lower order data processing elements by this connection.

A complete description of the details of the data processing elements and the kernal software is included in the above-referenced copending application.

While there have been described what are believed to be the preferred embodiments of the invention, those skilled in the art will recognize that other and further modifications may be made thereto without departing from the spirit of the invention and it is intended to claim all such changes and modifications as fall within the scope of the invention.

I claim:

1. In a data processing system comprising a binary tree of data processing elements, each including a central processing unit, and an interface unit having registers, including a first register, an output register coupled to a corresponding input register in the interface unit of an adjoining higher order data processing element and input registers coupled to corresponding output registers of adjoining lower order data processing elements in said binary tree, a method for selecting one of said data processing elements, comprising the steps of:

setting selected values in said registers;

comparing in said registers in each higher order interface unit the selected values in said output registers for adjoining lower order interface units with the selected value in said first register of said higher order interface unit to select according to a selected logic order one of said data processing elements having an interface unit register value with a desired value characteristic;

inactivating the data processing elements, except for the selecting one;

substituting the register value with the desired value characteristic for the output register value of said higher order interface unit; and repeating said comparing, inactivating and substituting steps until all but one data processing element of said binary tree of data processing elements is activated.

2. A method for processing data in a series of operations wherein the results of earlier operations are used to vary the parameters of later operations, comprising the steps of:

providing a binary tree of data processing elements, each data processing element including an output register coupled to provide a value stored therein to a corresponding input register in an adjoining higher order data processing element and input registers coupled to receive the respective values stored in corresponding output registers in adjoining lower order data processing elements in said binary tree;

providing instructions and data to said data processing elements as required for data processing according to a first operation;

simultaneously processing data in said data processing elements according to said first operation and providing a respective resultant value to a first register in each of said data processing elements;

comparing in said first and input registers of each higher order data processing element said respective resultant value with said values stored in said corresponding output registers of said adjoining lower order data processing elements to identify a most favorable value and storing said most favorable value in said output register of said higher order data processing element;

providing further instructions and/or data to said processing elements for a second operation, said further instructions and/or data being dependent on said most favorable resultant value;

simultaneously processing data in said data processing elements according to said second operation and providing a respective resultant value to said first register in each of said data processing elements; and comparing in said first and input registers of each higher order data processing element said respective resultant value with said values stored in said corresponding output registers of said adjoining lower order data processing elements to identify a most favorable value and storing said most favorable value in said output register of said higher order data processing element.

3. A method for providing signals representing instructions or data to the data processing elements in a data processing system comprising a binary tree arrangement of data processing elements, each including a central processing unit, a memory, a first register and registers coupled to corresponding registers in adjoining higher and lower order data processing elements in said binary tree, each of said data processing elements including kernel software, comprising the steps of:

initializing all of said data processing elements and said registers under control of said kernel software;

broadcasting common signals to all of said data processing elements via said coupled registers;

storing said common signals in said memories of all of said data processing elements under control of said kernel software;

in sequence selecting one of said data processing elements in accordance with the state of one of said coupled registers in each of said data processing elements;

broadcasting individual signals to all of said data processing elements via said coupled registers; and storing said individual signals in said selected element.

4. The method specified in claim 3 for a system wherein said coupled registers include input registers and wherein said broadcasting steps comprises providing a serial data stream to said input registers and storing said serial data in said input registers.

5. The method specified in claim 3 for a system wherein said coupled registers include output registers and wherein said step of sequentially selecting said data processing elements comprises setting a first selected value in the output registers for all unsequenced data processing elements, setting a second selected value in the output registers of all sequenced data processing elements, said second selected value being less favorable than said first selected value according to predetermined criteria; comparing in said registers of each higher order data processing element the values in the first register of the higher order data processing element and the value in the output registers of the two adjacent lower order data processing elements to select a data processing element having an output register with a most favorable value according to a selection order; and inactivating the data processing elements which are not selected.

6. A method for processing data in a data processing system comprising a binary tree arrangement of data processing elements, each including a central processing unit, a memory, a first register and registers coupled to corresponding registers in adjoining higher and lower order data processing elements in said binary tree and each of said data processing elements including kernel software, comprising:

initializing all of said data processing elements and said registers under control of said kernel software;

broadcasting common signals to all of said data processing elements via said coupled registers, said common signals being representative of common instructions and/or data;

storing said common signals in said memories of all of said data processing elements under control of said kernel software;

in sequence selecting one of said data processing elements in accordance with the state of one of said coupled registers in each of said data processing elements;

broadcasting individual signals to all of said data processing elements via said coupled registers, said individual signals being representative of individual instructions and/or data;

storing said individual signals in said selected element;

operating said data processing elements concurrently using program instruction and data included in said common and individual signals and storing a respective result in said first register in each of said data processing elements; and selecting via said coupled registers one of said data processing elements having a most favorable result and reporting said most favorable result to a root processing element of said binary tree arrangement via said coupled registers.

7. In a data processing system comprising a binary tree of data processing elements, said data processing elements being connected in said binary tree by coupled registers, a method for processing data, comprising:

providing said data processing elements with individual program instructions;

broadcasting signals to said data processing elements by said coupled registers;

operating said data processing elements under control of said individual program instructions to cause at least some of said data processing elements to become logically disconnected from said binary tree, to process said broadcast signals and to logically reconnect to said binary tree;

and reporting the results of said processed data to a root processing element of said binary tree arrangement by said coupled registers.

* * * * *

UNITED STATES PATENT AND TRADEMARK OFFICE
CERTIFICATE OF CORRECTION

PATENT NO. : 4,843,540

DATED : June 27, 1989

INVENTOR(S) : Salvatore J. Stolfo

Page 1 of 2

It is certified that error appears in the above-identified patent and that said Letters Patent is hereby corrected as shown below:

First page, Item 56, after fifth line, insert
-- 4,412,285   10/1983   Neches et al. --;
after eighth line, insert
-- 4,591,980   5/1986   Huberman et al. --;
following the last line, insert -- A.H. Veen, "Data Flow Machine Architecture," ACM Computing Surveys, Vol. 18, No. 4, 12/86, pp. 365-396 --.  Col. 2, line 55, after "identical" insert -- data --.  Col. 5, line 9, "64K1" should read -- 64KX1 --; line 33, "is" should read -- are --; line 48, "desireable" should read -- desirable --; line 55, "are" should read -- is --.  Col. 6, line 51, "desireable" should read -- desirable --; line 57, "is" should read -- dis- --.  Col. 7, line 32, "received" should read -- receives --.  Col. 9, line 36, "Register" should read -- Registers --.  Col. 10, line 44, "in" should read -- and --; line 64, second occurrence, "in" should read -- of --; line 66, "K" should read -- KR --.  Col. 13, line 2, "it" should be -- its --.  Col. 14, line 4, "caused" should read -- causes --; line 16, after "be" insert -- a --.

UNITED STATES PATENT AND TRADEMARK OFFICE
CERTIFICATE OF CORRECTION

PATENT NO. : 4,843,540

DATED : June 27, 1989

INVENTOR(S) : Salvatore J. Stolfo

It is certified that error appears in the above-identified patent and that said Letters Patent is hereby corrected as shown below:

Col. 17, line 21, "selecting" should read --selected--.

Col. 18, line 33, "comprises" should read --comprise--.

Signed and Sealed this

Ninth Day of October, 1990

Attest:

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,843,540
DATED : June 27, 1989
INVENTOR(S) : Salvatore J. Stolfo

It is certified that error appears in the above-indentified patent and that said Letters Patent is hereby corrected as shown below:

Column 17, line 28, "activated" should read --inactivated--.

Signed and Sealed this

Twenty-fourth Day of May, 1994

Attest:

BRUCE LEHMAN

*Attesting Officer*     *Commissioner of Patents and Trademarks*